United States Patent [19]

Wallace

[11] 4,348,714

[45] Sep. 7, 1982

[54] MULTILAYER TUBULAR CAPACITOR AND FABRICATION THEREOF

[75] Inventor: Clarence L. Wallace, Solana Beach, Calif.

[73] Assignee: Cladan Incorporated, San Marcos, Calif.

[21] Appl. No.: 207,028

[22] Filed: Nov. 14, 1980

[51] Int. Cl.³ .................. H01G 1/015; H01G 13/00
[52] U.S. Cl. ................... 361/328; 29/25.42; 361/304; 361/321; 428/43; 428/209; 428/210
[58] Field of Search ............... 361/303, 304, 330, 328, 361/321; 428/209, 210, 43; 29/25.42; 427/79

[56] References Cited

U.S. PATENT DOCUMENTS

| | | |
|---|---|---|
| 2,548,862 | 4/1951 | Brandt . |
| 2,637,766 | 5/1953 | Grouse . |
| 2,683,792 | 7/1954 | Dubilier . |
| 2,958,117 | 11/1960 | Robinson ........................ 361/304 X |
| 3,004,197 | 10/1961 | Rodriguez et al. . |
| 3,274,468 | 9/1966 | Rodriguez et al. . |
| 3,380,854 | 4/1968 | Robinson . |
| 3,400,312 | 9/1968 | Dornfeld ........................ 361/304 X |
| 3,564,359 | 2/1971 | Coda et al. . |
| 3,654,532 | 4/1972 | Rayburn ........................... 361/304 |
| 3,815,187 | 6/1974 | Hanold . |

FOREIGN PATENT DOCUMENTS

| | | |
|---|---|---|
| 1439600 | 7/1962 | Fed. Rep. of Germany . |
| 1175919 | 6/1957 | France . |
| 178397 | 7/1922 | United Kingdom ............... 361/330 |
| 811983 | 4/1959 | United Kingdom ............... 361/303 |
| 982293 | 2/1965 | United Kingdom ............... 361/304 |
| 1408075 | 10/1975 | United Kingdom ............... 361/304 |

Primary Examiner—Elliot Goldberg
Attorney, Agent, or Firm—William W. Haefliger

[57] ABSTRACT

A roll-up capacitor structure is embodied by
(a) a carrier sheet, and
(b) electrodes on said sheet in spaced relation along a length dimension of said sheet, the electrodes having progressively increasing length along said sheet length dimension.

8 Claims, 6 Drawing Figures

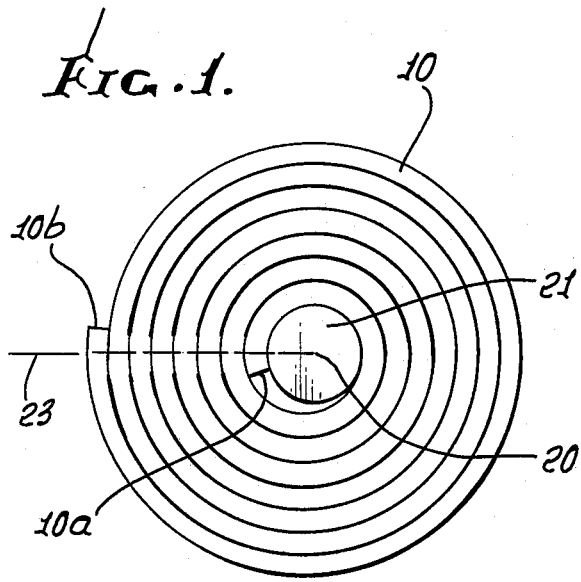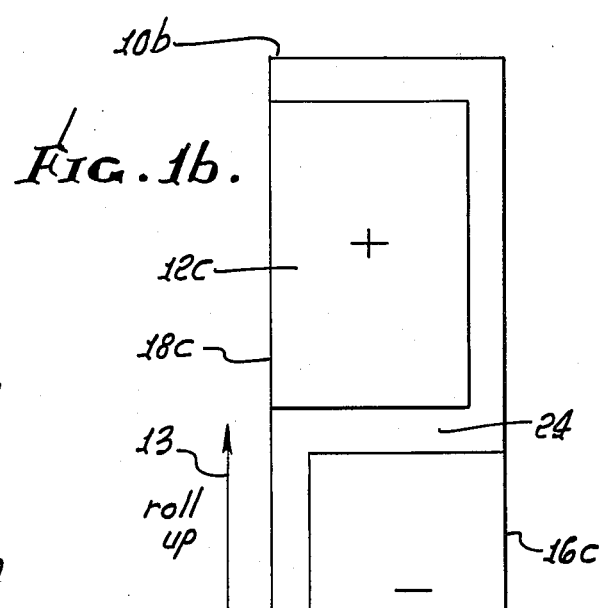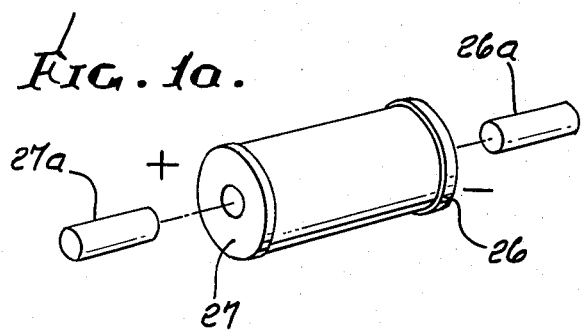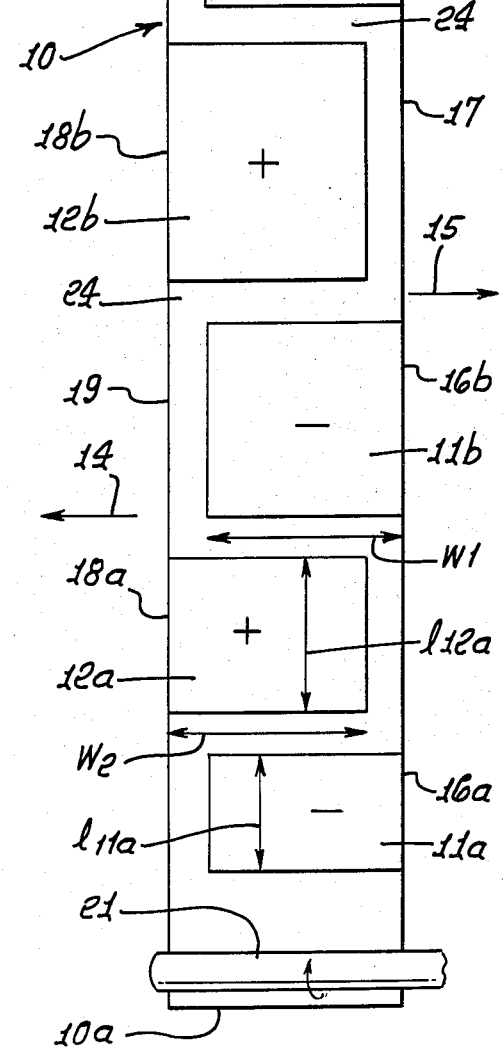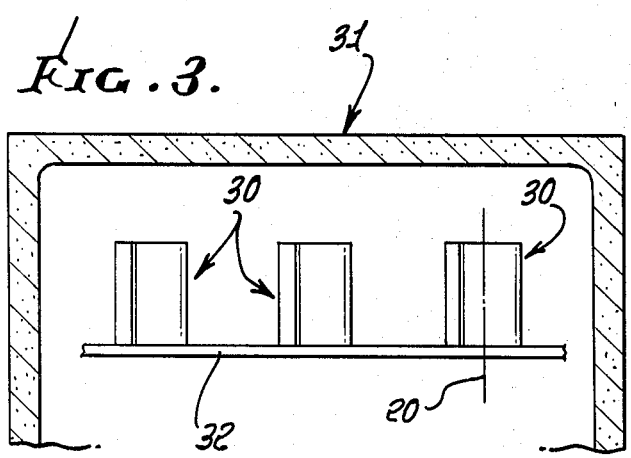

MULTILAYER TUBULAR CAPACITOR AND FABRICATION THEREOF

BACKGROUND OF THE INVENTION

This invention relates generally to the provision of capacitors, and more particularly concerns novel methods for producing ceramic multilayer capacitors, enabled by novel configurations of same.

There is a constant need for lowering the cost and speeding the production of electrical components, such as capacitors, and without diminishing the operating performance and useful lives of such capacitors. While numerous capacitor designs have been proposed in the past, none have to my knowledge incorporated the unusual advantages in roll-up and end terminated construction, fabrication, and concomitant results as are now afforded by the capacitors described herein and their improved methods of fabrication.

SUMMARY OF THE INVENTION

Fundamentally, the new roll-up capacitor structure is embodied by:
 (a) a carrier sheet, and
 (b) electrodes on said sheet in spaced relation along a length dimension of said sheet, the electrodes having progressively increasing length along said sheet length dimension.

As will appear, the electrodes may successively be staggered along the sheet length dimension (the roll-up direction) and normal thereto; and certain electrodes typically have first edges located in a first line in the roll-up direction, and other electrodes typically have second edges located in a second line in the roll-up direction, whereby upon roll-up the first edges may be "end terminated" by one end terminal, and the second edges may be "end terminated" by another end terminal.

Such roll-up brings the alternating electrodes into superposition, radially, to act as alternate plates of a multilayer capacitor, i.e. providing high capacitance per unit volume.

Further, the electrodes may consist of metallic ink, and the carrier sheet may consist of thin ceramic ware, as further defined herein.

The basic method of fabrication includes the steps:
 (a) providing a carrier sheet, and
 (b) forming electrodes on the sheet in spaced relation along a length dimension of the sheet, said electrode forming carried out to provide the electrodes with progressively increasing length along the sheet length dimension.

Further, multiple multilayer capacitors may be formed using a single rolled up sheet with columns of electrodes formed thereon, as will appear.

These and other objects and advantages of the invention, as well as the details of an illustrative embodiment, will be more fully understood from the following description and drawings, in which:

DRAWING DESCRIPTION

FIG. 1 is an enlarged cross section taken through a multilayer tubular compacitor, showing electroding;

FIG. 1a is an external perspective view of the FIG. 1 capacitor;

Figure 2:
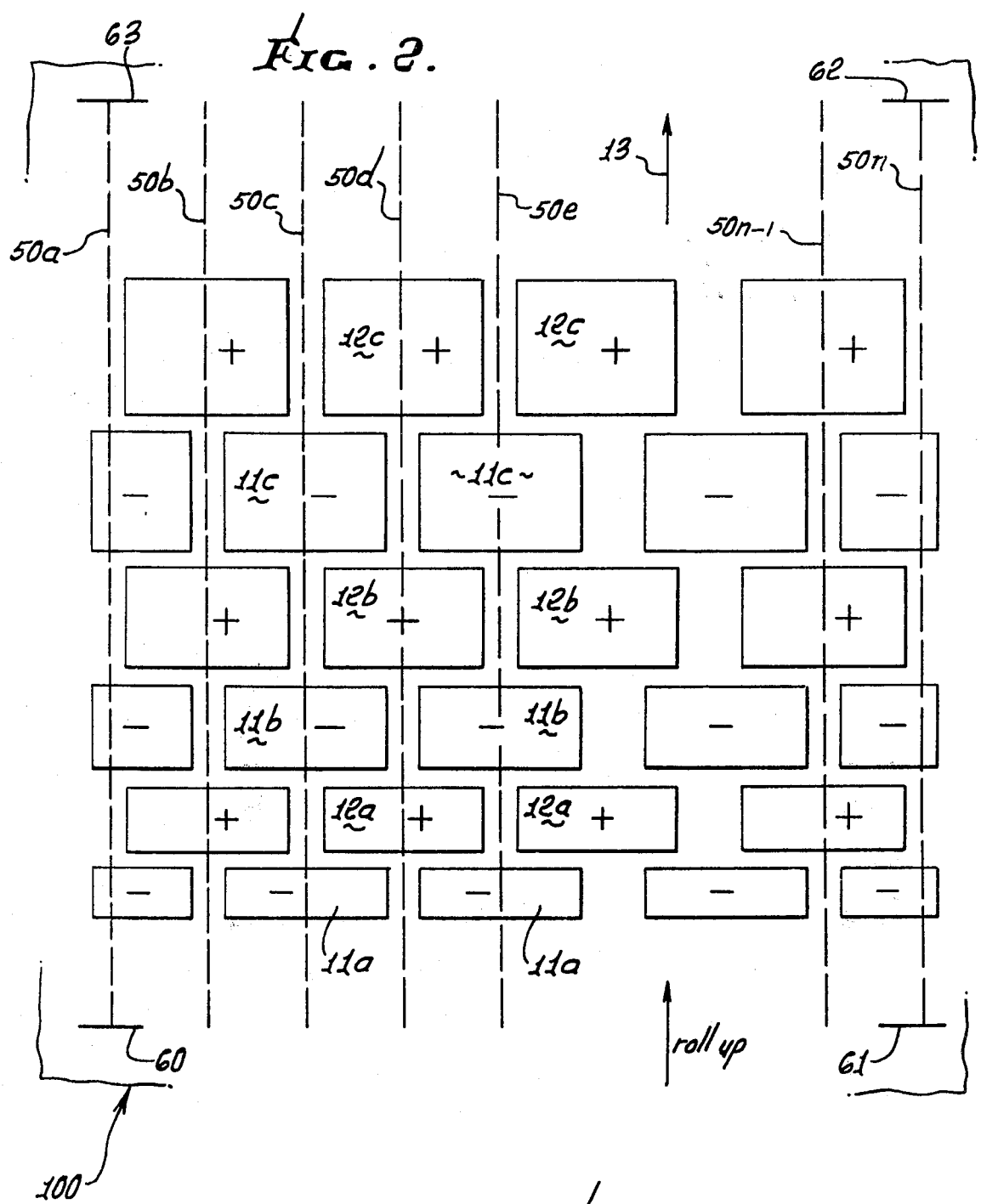
Figure 4:
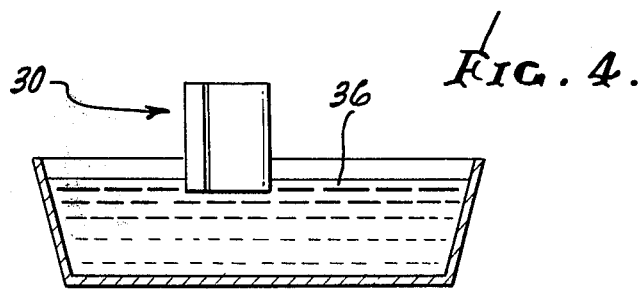

FIG. 1b in plan view showing the FIG. 1 capacitor in un-rolled state, i.e. prior to rolling; and FIG. 2 is a view like FIG. 1b but showing an electrode configuration enabling rapid fabrication; and FIGS. 3 and 4 show fabrication steps.

DETAILED DESCRIPTION

The following is a definition of terms as used herein:
A. "Ink": as used herein refers to a thick vehicle suitable for screen-printing, which contains finely powdered metals such as silver, palladium, platinum, gold, or others determined by compatibility with the dielectric ceramic used.
B. "Ceramic ware": a thin, flexible material upon which the "ink" mentioned above is printed. This material consists of a finely powdered ceramic suspended in a plastic binder which provides the necessary strength and handling properties. The ceramic material used is one of many which exhibit desirable electrical characteristics, such as high dielectric constant, good temperature stability, etc.
C. "Burnout": a process applied to structures consisting of layers of ceramic ware and metal ink, in which the temperature is raised at a controlled rate. All non-metallic and non-ceramic materials are "burned out" slowly enough that the structure is not disturbed by the escaping gases.
D. "Firing": a high-temperature treatment which causes the particles of ceramic to join together, and the finely powdered metal to unify into conductive sheets. Crystal growth in the ceramic is controlled to optimize electrical characteristics. Approximately 20% shrinkage of all linear dimensions results from this process.
E. "Mandrel": the rod around which the ceramic ware is wrapped. This rod may be removed before burnout if it is composed of metal, or it may be left in place if it is ceramic or some material which will burn away during burnout.
F. "Termination Ink": Consists of an organic vehicle containing powdered metal plus glass frit, which is usually applied to a fired capacitor by dipping. When fired on, the glass content promotes a good bond to the ceramic surface, while the metal content results in a good electrical connection.

Referring first to FIG. 1b a carrier sheet, which may preferably consist of ceramic ware, is indicated at 10. Formed on the sheet, as by screening, are a plurality of electrodes indicated at 11a–11c, and 12a–12c. The electrodes are spaced apart in the roll-up, longitudinal sheet length dimension indicated by arrow 13; they are preferably rectangular in shape, and they have increasing length. If "l" indicates the length dimension of an electrode, then the following relationship exists:

$$l11a < l12a < l11b < l12b < l11c < l12c,$$

wherein the electrodes sequence is:

11a, 12a, 11b, 12b, 11c, 12c.

Thus, the electrodes have progressively increasing lengths, along the sheet length dimension or direction indicated by arrow 13.

Further, the electrodes are successively staggered along that direction and normal thereto; thus electrode 12a is leftwardly offset in normal or lateral direction 14 relative to electrode 11a, 11b is offset to the right in normal direction 15 relative to electrode 12a, electrode 12b is offset to the left relative to 11b–etc. Further, electrodes 11a, 11b and 11c are of the same width $\omega_1$ and extend in a column, and electrodes 12a-12c are of the same width $\omega_2$, and extend in a column. Normally, $\omega_1$ is the same as $\omega_2$.

In addition, certain electrodes (as for example electrodes 11a-11c) have first edges (right edges 16a-16c) located in a first line, as for example is defined by carrier sheet edge 17; and other electrodes (as for example electrodes 12a-12c) have second edges (left edges 18a-18c) located in a second line, as for example is define by carrier sheet edge 19. Edges 17 and 19 are parallel, as shown. Electrodes 11a-11c are everywhere spaced from line 19, and electrodes 12a-12c are everywhere spaced from line 17. Finally, successive electrodes along the direction 13 have prgressively increasing area. To this end, if the electrodes all have the same width, then:

$$\omega l11a < \omega l12a < \omega l11b < \omega l12b < \omega l11c < \omega l12c$$

FIG. 1 shows the carrier sheet, i.e. ceramic ware 10 extending in a spiral about a roll-up axis 20 defined by the axis of cylindrical mandrel 21. See also that mandrel in FIG. 1b, in position for roll-up. Opposite ends of the sheet are indicated at 10a and 10b, and it will be noted that all electrodes as described are at one side of the sheet. A generally radial gap line is formed at 23 by the gaps between the electrodes, such gaps 24 for example having the same dimension in the direction of arrow 13 in FIG. 1b. Accordingly, in rolled up condition, the electrodes are precisely superposed over one another, in spiral arcs, and in the same sequence as shown in FIG. 1b, the carrier sheet having the same thickness throughout its length. Each electrode or capacitor "plate" corresponds to one wrap of the carrier, and the successive plates are longer as the ware is wrapped up.

FIG. 1a shows first and second, axially spaced apart end terminals such as caps 26 and 27 carried by the rolled up sheet or ware. First terminal 26 is in electrical contact with edges 16a-16c electrodes 11a-11c; and second terminal 27 is in electrical contact with edges 18a-18c of electrodes 12a-12c. Thus, first terminal 26 is in contact with certain electrodes, and second terminal 27 is in electrical contact with other electrodes which extend in alternating relation with the certain electrodes, radially in axis. 20.

In the above, the electrodes, typically consist of metalic "ink" as defined above. Certain of such inks and ceramic ware are described in U.S. Pat. No. 4,183,074 to Wallace.

After the rolling operation as described, the structure is unified by the application of isostatic radial compression (lamination). Burnout and firing of the wrapped structure are accomplished with the part standing up on end, i.e. with the axis 20 extending vertically. See FIG. 3, showing wrapped units 30 in burnout and firing oven 31, and standing on end on support 32. Thereafter, the end terminals 26 and 27 are applied.

The terminals 26 and 27 may be formed by coating the opposite ends of the wrap with an "end termination ink," as defined above. FIG. 4 shows the unit being dipped into ink 36 in a tray 37. After such end coating, a second firing at lower temperature is carried out to remove (volatilize) the non-metallic carrier in the ink, and fuse the powdered metal ink at each end of the wrap, in electrical contact with the edges of the electrodes.

The ceramic ware (carrier sheet) typically may consist of a mixture of CL750 ceramic body produced by Solid State Dielectric Corp., of Sun Valley, Calif.; Cladan B62 organic binder, and micronsize barium titanate powder, and have unfired thickness between 0.005 and 0.010 inches. Ceramic compositions produced by TAM division of National Lead are also usable. The ink may consist of known DuPont or Cladan Inc., capacitor electroding inks. End termination inks are produced by Sel Rex Corp.

In FIG. 2, the electrodes are again designated at 11a-11c, and 12a-12c. Multiple first columns of electrodes 11a-11c are provided, and multiple second columns of electrodes 12a-12c are also provided, as shown. The carrier sheet 100 (corresponding to sheet 10, but much wider, to accommodate the multiple columns) is typically perforated along parallel lines 50a-50n which extend in the direction of arrow 13, and which are laterally spaced apart. Certain of these lines intersect only certain of the electrodes (i.e. lines 50a-50c-50e, etc., intersect only electrodes 11a-11c) in the multiple columns of same; and others of the lines intersect only other of the electrodes (i.e. lines 50b-50d—etc., intersect only electrodes 12a-12c) in the multiple columns of same. As before, the certain electrodes 11a-11c extend in sequentially alternating relation with the other electrodes 12a-12c, in the sheet length direction 13. The preforation of the sheet may be effected prior to or subsequent to electrode application.

Accordingly, after spiral wrap-up, followed by servering along lines 50a-50n, multiple capacitors are formed, each being like the capacitor shown in FIGS. 1, 1a and 1b.

Note in FIG. 2 that the lines 50b-50n−1 typically bisect the rectangular electrodes which they intersect. Also, end trim locations are indicated at 60-63.

Additional unusual advantages are listed as follows:
A. Cylindrical configuration provided:
  1. Can be handled by existing automatic insertion equipment due to similarity in shape to resistors.
  2. For above reason, many manufacturers package their rectangular chips in cylindrical packages, thus taking a major loss in volumetric efficiency. Applicant's method and design avoids this loss.
  3. When "bell-cap" terminated (as in metal film resistors), no encapsulation is necessary.
B. Roll-up method and design:
  1. Single-print system: no need for precise registration between several prints; i.e. easier to roll-up.
  2. Electrical short immunity: if the "gap line" in FIG. 1a is not radial (indicating any of several problems, inclijding deviation from the expected dielectric thickness, improper trim, etc.), this does not result in a short, but only in a small decrease in capacitance.
  3. If desired, labelling information can be printed on the reverse side of the ware, before roll-up.
  4. In a production environment, capacitance can easily and reversibly be "trimmed" by selectively blocking out a portion of the print. This can be accomplished with a piece of Mylar tape on the under-side of the screen containing the pattern.

In the above description, "burnout" is typically carried out at about 700° F. prior to roll-up; "firing" is typically carried out after roll-up, and in a kiln, at about 2,400° F.; and the end termination ink is typically fired at about 1,500° F.

The perforations along lines 50a–50n may be severed after roll-up, and before firing, as by manual (or machine) breaking apart of the segments of the roll along the spiral perforation planes. This can be effected very rapidly, and enables subsequent firing with the capacitors arranged as in FIG. 3.

In FIG. 1a, leads or pins to be integral with end caps 26 and 27 are indicated at 26a and 27a.

I claim:

1. In capacitor structure adapted to be cut and rolled up,
   (a) a carrier sheet having width and length dimensions, and
   (b) metallic ink electrodes on said sheet in spaced relation along the length dimension of said sheet, the electrodes having progressively increasing surface dimension along said sheet length dimension,
   (c) said electrodes being arranged in first multiple parallel columns spaced apart laterally along the sheet width dimension, and second multiple parallel columns spaced apart laterally along the sheet width dimension,
   (d) lengthwise successive electrodes in the first columns being in widthwise alighnment, and lengthwise successive electrodes in the second columns being in widthwise alignment,
   (e) said successive electrodes in each of the second columns projecting laterally between successive electrodes in each of two of the first columns.

2. The capacitor of claim 1 wherein the sheet is perforated along parallel lines which are laterally spaced apart and which extend in the direction of said length dimension, certain of said lines intersecting only first column electrodes and others of the lines intersecting only second column electrodes.

3. The capacitor structure of claim 1 wherein said sheet extends in a spiral about a roll-up axis.

4. The capacitor structure of claim 2 wherein the sheet extends in a spiral about a roll-up axis, whereby upon severing of the sheet along perforated lines multiple capacitors are formed, and including said lines.

5. The method of forming capacitor structures, that includes:
   (a) providing a carrier sheet having length and width dimensions,
   (b) forming metallic ink electrodes on the sheet in spaced relation along the length dimension of the sheet, said electrode forming carried out to provide said electrodes with progressively increasing surface dimension along said sheet length dimension,
   (c) said (b) step including arranging the electrodes in first multiple parallel columns spaced apart laterally along the sheet width dimension, and second multiple parallel columns spaced apart laterally along the sheet width dimension,
   (d) said (c) step characterized by lengthwise successive electrodes in the first columns being in widthwise alignment, and lengthwise successive electrodes in the second columns being in widthwise alignment,
   (e) said (c) step further characterized by said successive electrodes in each of the second columns projecting laterally between said successive electrodes in each of two of the first columns.

6. The method of claim 5 including perforating the sheet along parallel lines which are laterally spaced apart and which extend in the direction of said length dimension, certain of said lines intersecting only first column electrodes and other of the lines intersecting only second column electrodes.

7. The method of claim 6 that includes spirally rolling the sheet about a roll-up axis normal to said length dimension, and severing the sheet along said perforated lines to provide multiple capacitors.

8. The method of claim 7 including providing first and second end terminals on the rolled sheet associated with each capacitor so that the first terminal is in electrical contact with first column electrodes and the second terminal is in electrical contact with second column electrodes which extend in alternating relation with the first column electrodes, radially of said axis.

* * * * *